United States Patent [19]

Braun et al.

[11] Patent Number: 5,524,141
[45] Date of Patent: Jun. 4, 1996

[54] SYSTEM AND METHOD FOR PROVIDING DIRECTORY INFORMATION OVER A TELEPHONY NETWORK USING ADSI

[75] Inventors: David A. Braun, Denville; Terence J. Nelson, New Providence; William A. E. Nilson, III, Bridgewater; Lanny S. Smoot, Morris Township, Morris County, all of N.J.

[73] Assignee: Bell Communications Research, Inc., Morristown, N.J.

[21] Appl. No.: 310,913

[22] Filed: Sep. 22, 1994

[51] Int. Cl.$^6$ ............................................. H04M 11/08
[52] U.S. Cl. .................... 379/93; 348/17; 348/14; 379/201; 379/252
[58] Field of Search ............................ 379/93, 97, 104, 379/105, 102, 201, 252; 348/12, 17, 14, 8, 15, 20, 16

[56] References Cited

U.S. PATENT DOCUMENTS

| | | | |
|---|---|---|---|
| 4,792,849 | 8/1987 | McCalley et al. | 358/86 |
| 5,130,792 | 7/1992 | Tindell et al. | 358/85 |
| 5,132,992 | 7/1992 | Yurt et al. | 375/122 |
| 5,164,980 | 11/1992 | Bush et al. | 348/17 |
| 5,231,492 | 7/1993 | Dangi et al. | 348/17 |

(List continued on next page.)

OTHER PUBLICATIONS

*User Guide*, Pub. Phillips Home Services International B.V., Eindhover, The Netherlands, 1992, pp. 1–17.

"Generic Requirements for an SPCS to Customer Premises Equipment Data Interface for Analog Display Services", *Technical Reference TR-NWT-001273*, Dec. 1992.

B. K. Schwartz, "The Analog Display Services Interface", *IEEE Communications Magazine*, 1993, pp. 70–75.

B. K. Schwartz, "Right before your eyes," Bellcore Exchange, Sep./Oct. 1992, pp. 14–29.

F. Morales et al., "The TV Answer Viewer Response System," *IEEE Transactions on Broadcasting*, 1989, vol. 35, pp. 2–7.

Primary Examiner—Jeffery Hofsass
Assistant Examiner—Scott Wolinsky
Attorney, Agent, or Firm—Leonard C. Suchyta; Loria B. Yeadon

[57] ABSTRACT

A system and method for accessing directory information over a telephony network employing the ADSI protocol and for presenting the directory information at the user's conventional TV monitor are described. The system includes a directory service unit, a telephony network, such as the public switched telephony network, and multiple user interface units. The directory service unit receives, processes, and stores in memory directory information from directory information providers which information is transmitted to the user interface unit of requesting users on demand. The directory service unit is connected to user interface units via the telephony network and uses the ADSI protocol to communicate data and voice signals containing directory information to users. Each user interface unit converts directory information in the form of data signals into signals for display on the user's TV screen and transmits audio directory information, such as audio program description, to the audio input of the user's TV monitor. The user interface unit also converts requests and interactive inputs generated by the user at the infrared remote of the TV monitor into local display commands for locally controlling the appearance of directory information on the user's TV monitor or into DTMF digits for transmission to the directory service unit. On receiving a user's request for directory service, the directory service unit transmits to the user menus of directory information in ADSI format, which menus are processed at the user interface unit for display on the user's TV screen. On receiving the user's interactive inputs in the form of DTMF digits for a specific directory or a program description, the directory service unit retrieves the appropriate information from memory, and transmits it in ADSI format to the user interface unit where the requested information is processed for presentation at the user's TV monitor.

11 Claims, 11 Drawing Sheets

U.S. PATENT DOCUMENTS

| | | | |
|---|---|---|---|
| 5,247,347 | 9/1993 | Litteral et al. | 358/85 |
| 5,341,474 | 8/1994 | Gelman et al. | 395/200 |
| 5,365,577 | 11/1994 | Davis et al. | 348/17 |
| 5,367,331 | 11/1994 | Secher et al. | 348/17 |
| 5,371,534 | 12/1994 | Dagdeviren et al. | 348/17 |
| 5,390,239 | 2/1995 | Morris et al. | 379/97 |
| 5,396,546 | 3/1995 | Remillard | 379/105 |
| 5,404,393 | 4/1995 | Remillard | 379/105 |
| 5,412,708 | 5/1995 | Katz | 379/102 |
| 5,414,773 | 5/1995 | Handelman | 379/97 |
| 5,416,831 | 5/1995 | Chewning, III et al. | 379/97 |

SYSTEM AND METHOD FOR PROVIDING DIRECTORY INFORMATION OVER A TELEPHONY NETWORK USING ADSI

RELATED APPLICATION

U.S. patent application Ser. No. 08/097,509, entitled *Method and System for Automated Service Script Consolidation and Downloading to Telecommunications CPE with Displays*, filed on Jul. 27, 1994, for inventor D. T. Hou and assigned to the assignee hereof, contains subject matter related to that of the present application.

FIELD OF THE INVENTION

This invention relates to the Analog Display Service Interface (ADSI) protocol and specifically to a system and method for providing directory information to users over a telephony network employing the ADSI protocol.

BACKGROUND OF THE INVENTION

Many magazines, newspapers, and other publications have built their readership around the growing market of television (TV) viewers who desire TV program information. Many cable TV networks have even designated a TV channel for providing nothing other than the date, time, and channel, at which TV programs will be presented. These conventional sources of TV program information are only useful if they are readily available to the TV viewer when the viewer desires the information. Unless the viewer is a regular subscriber of a publication or cable TV network which provides this information, these conventional sources may not be sufficiently accessible to be useful to the TV viewer. But even if the viewer were a subscriber, these conventional sources may not be cost effective if the viewer only occasionally makes reference to the program information.

Another drawback of publications containing program information is that TV viewers may not be provided with current program information. Specifically, changes in program formats, scheduling of special broadcasts, and delays in program start times which occur after the publication has gone to press may not be reflected in the publication. Although program listings on cable TV are online and are capable of being periodically updated to reflect program changes and to provide more current program information, this program information source has other drawbacks. In particular, program listings on cable TV are typically presented in a continuous scrolling fashion, and the format of information is typically pre-set to include the time, channel, and title of each program being shown on the current day. Therefore, TV viewers desiring specific program information may have to wait while screens of other program information scroll by before reaching the desired program information.

Another drawback of conventional sources of program information is that the users have no interactive capabilities to narrow the scope of the program information being provided to only that desired by the user. For example, the user does not have the flexibility to request program listings by category (e.g. news, sports, drama, comedy, education) or to specify the time and date of the desired listing. Furthermore, the user does not have the flexibility to obtain a detailed description of any program appearing in the listing. Although some publications provide written detailed descriptions of programs appearing in the listing, such written descriptions may not adequately capture the action, intrigue, and mystery of the program such that readers can envision the contents of the program.

A number of interactive video systems have been described in the prior art which could be utilized to provide program listings to subscribers on demand. (For descriptions of such interactive video systems, see, *Communications Architecture and Method Of Distributing Information Services*, U.S. Pat. No. 5,341,474, issued Aug. 23, 1994; *PSTN Architecture for Video-On-Demand Services*, U.S. Pat. No. 5,247,347, issued Sep. 21, 1993: *Audio and Video Transmission and Receiving System*, U.S. Pat. No. 5,132,992, issued Jul. 21, 1992: *Store and Forward Video System*, U.S. Pat. No. 5,130,792, issued Jul. 14, 1992: *Communications Architecture and Method of Distributing Information Services*, U.S. patent application Ser. No. 07/884,516, filed May 15, 1992 and allowed Aug. 19, 1994; and *Digital Interactive Communication System*, U.S. Pat. No. 4,792,849, issued Dec. 20, 1988.)

A drawback of many prior interactive video systems is that the user is required to purchase expensive customer premises equipment (CPE) in order to access information. Additionally, interactive video systems, which are primarily designed to support the transport of enhanced video, are "overkill" for users who only want program information, and therefore do not need the capabilities and associated costs of an interactive video system.

Realizing the drawbacks of using previous video interactive systems in providing program listings, an object of our invention is a system and a method of providing to users directory information, comprising TV program listings and similar information, on a cost-effective basis and utilizing subscriber's existing equipment with minimal additions. Given the fact that many potential users of directory information are also telephone subscribers and that the telephony network is an embedded infrastructure reaching most potential directory information users, a further object of our invention is to use the telephony network as the backbone of our system and method.

Recently, the Analog Display Service Interface (ADSI) protocol was developed as a standard for transferring voice and data in the telephony network between network service providers and telephone subscribers. (For more details on the ADSI protocol, see, *Generic Requirements for an SPCS to Customer Premises Equipment Data Interface for Analog Display Services*, TR-NWT-001273, December 1992.) The protocol was primarily developed as a result of the desire of network service providers to transmit data to subscribers' CPE, such as screen-based telephones, to assist the subscriber in accessing network voice services and thus increasing subscribers' use of network voice services, such as CLASS$^{SM}$ and Custom Calling Services (CCS).

CLASS is a Service Mark of Bellcore.

Screen-based telephones comprise screen displays and context-sensitive soft keys, and the telephone screen displays provide users with context sensitive menus, step by step prompts, visual indicators of the services status based on data received from network service providers to facilitate easy access to network voice services. This existing standard protocol for handling the transfer of voice and data between subscriber's CPE and network service providers, however, does not provide for the display of information at a conventional TV monitor associated with the user. Attempting to present at a TV monitor ADSI data signals intended for display on an LCD screen of a ADSI screen-based telephone would result in an unsatisfactory succession of jittery or flickering display on the TV monitor, which is particularly disturbing and irritating to the user. Accordingly, a further object of our invention is a system and method for providing users with directory information utilizing the ADSI standard protocol.

Therefore, in summary, objects of our invention include a system and a method for providing on demand directory information including program listings and similar information utilizing the telephony network and the ADSI standard protocol as the network backbone. To further minimize cost and complexity of providing directory information to users, an object of our invention is to connect our system to users' conventional TV monitors for presenting directory information. A further object is to permit the user to select interactively the directory information that is desired and to request detailed descriptions of programs in the directory, if available. A further object of our invention is a system and method for providing program descriptions to users in the form of text as well as audio to permit users to envision more fully the contents of the programs.

SUMMARY OF THE INVENTION

Aspects of our invention are a system and method for accessing directory information via the telephony network and presenting the directory information to users at their conventional TV monitors. Under our system and method, users can interactively access listings of TV programs by network, time of presentation, category, etc., and can receive detailed descriptions of programs in the form of audio or text. Our system comprises a directory service unit, a telephony network, such as the public switched telephony network, and multiple user interface units connected to users' telephone and TV equipment. The directory service unit and the user interface units are connected via the telephone network and communicate using the ADSI standard protocol.

The directory service unit receives directory information from directory information providers and processes and stores this information for subsequent transmission to requesting users. The directory service unit also receives users' requests and interactive inputs for directory information in the form of DTMF digits and responds by retrieving requested directory information from memory and transmitting this information via the telephony network to the user interface units of the requesting users.

At the user interface unit, directory information received from the directory service unit is processed from the ADS format and further processed, in accordance with an aspect of our invention for presentation at the user's TV monitor. Specifically, directory information transmitted as data signals is processed for display on the screen of the user's TV monitor, and directory information transmitted as a voice signal, such as audio directory descriptions, is output to the audio input of the user's TV monitor. In processing data signals for display on the user's TV monitor, successive screens of directory information, each representing a group of data signals, are each sequentially stored in one of N memory stores, and corresponding bits of information from each screen held in memory are compared to generated brightness information. The brightness information coupled with black burst and color subcarrier signals, is used to generate a video signal for display on the user's TV monitor. The user interface unit also receives infrared signals from the infrared remote control. The infrared signals are converted into local input commands such that the user can locally change the appearance of information on the user's TV monitor (i.e. highlight program entries) or into DTMF digits compatible with the ADSI format such that the user can generate directory requests and interactive inputs from the infrared remote control.

To access directory information, the user dials up the directory service unit and establishes a call connection. The directory service unit responds by sending an ADSI data signal to the user interface unit, which signal contains a menu of directories available for selection. The data signal is converted to TV format and displayed on the user's TV screen. On receiving the user's directory selection, the directory service unit retrieves from memory the selected directory and transmits it to the user interface unit where the directory is similarly converted and displayed. A user may also request audio descriptions of particular programs which are presented to the user at the audio system of the user's TV monitor.

The organization and operation of our invention will be better understood from a consideration of the detailed description of the illustrative embodiments thereof, which follow, when taken in conjunction with the accompanying drawing.

DETAILED DESCRIPTION OF THE INVENTION

Figure 1:
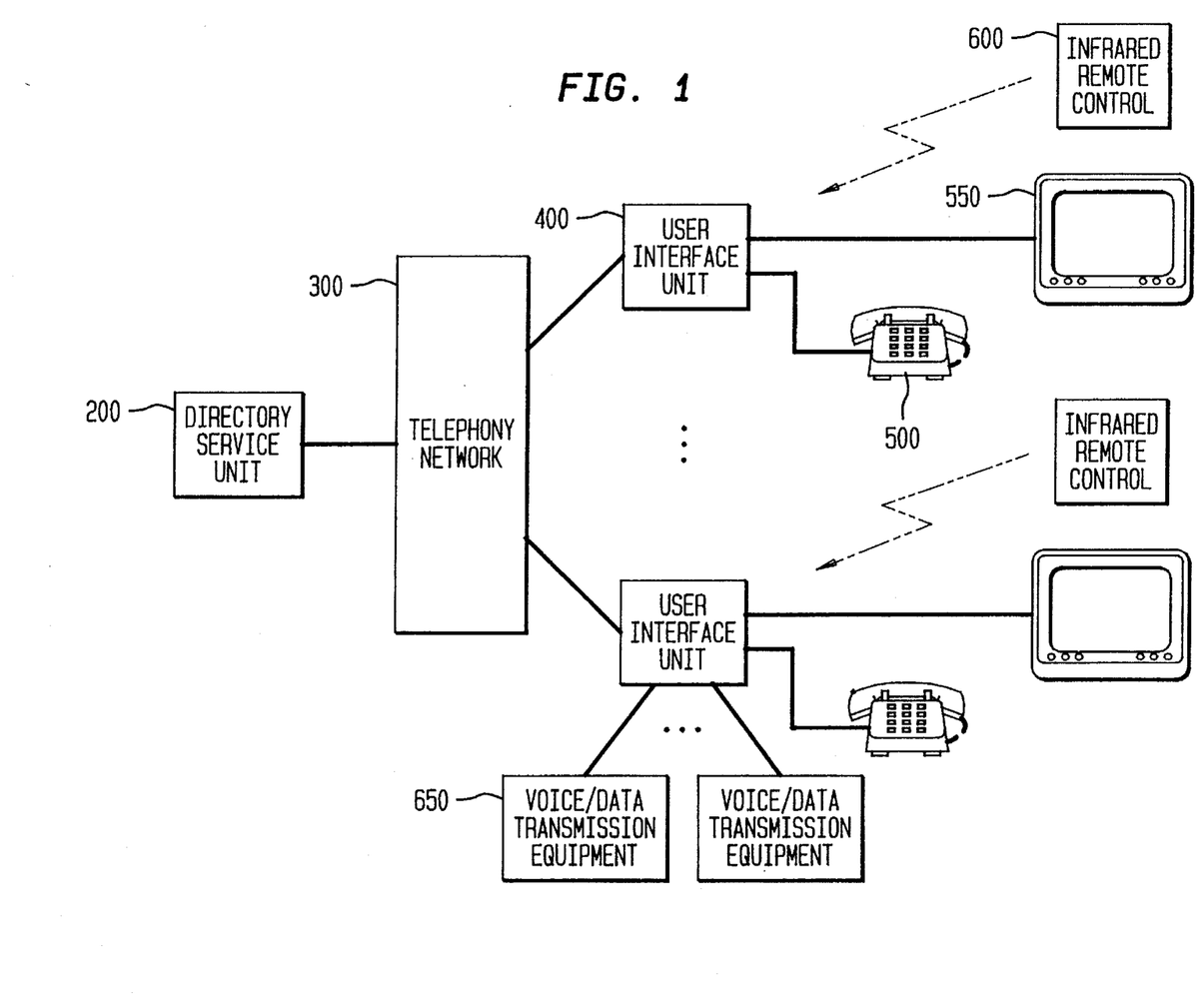
FIG. 1 depicts, in accordance with our invention, our inventive system for accessing directory information, on demand, via a telephony network employing the analog digital service interface (ADSI) protocol which directory information is displayed on the users' conventional TV equipment.

Our invention is a system and method for users to access directory information, on demand, via a telephony network employing the analog digital service interface (ADSI) protocol, which directory information is displayed on users' conventional TV equipment. Our inventive system 100 is shown in FIG. 1 and comprises a directory service unit 200, a telephony network 300, and multiple user interface units 400 connected to users' telephone equipment 500 and TV equipment 550. The directory service unit 200 receives, via the telephony network 300, requests from users for directory service and provides directory information to requesting users on demand. In an embodiment of our inventive system, the directory service unit 200 and user interface units communicate with one another via the telephony network using the ADSI standard protocol.

The ADSI protocol includes a set of messages and rules for the directory service unit and user interface units to follow while communicating with one another. Under the ADSI protocol, the directory service unit 200 has the capabilities to transmit different types of signals through the telephony network 300 to user interface units 400. These types of signals include voice and data coded in frequency-shift keying (FSK) digital signalling format. Under the ADSI protocol, the directory service unit also generates a CPE Alert Signal (CAS), which is a tone transmitted prior to data signals being sent to alert the user interface unit that the signal to follow is data and should be handled accordingly. The directory service unit waits for the user interface unit to acknowledge the CAS tone prior to transmitting the data signal. The CAS tone also causes the talk path over which voice communication takes place to be muted for a period of time sufficient for the data information to be transported to the user interface unit. Under the ADSI protocol, the user interface units communicate with the directory service unit by transmitting Dual Tone Multi-Frequency (DTMF) digits.

Figure 2A:
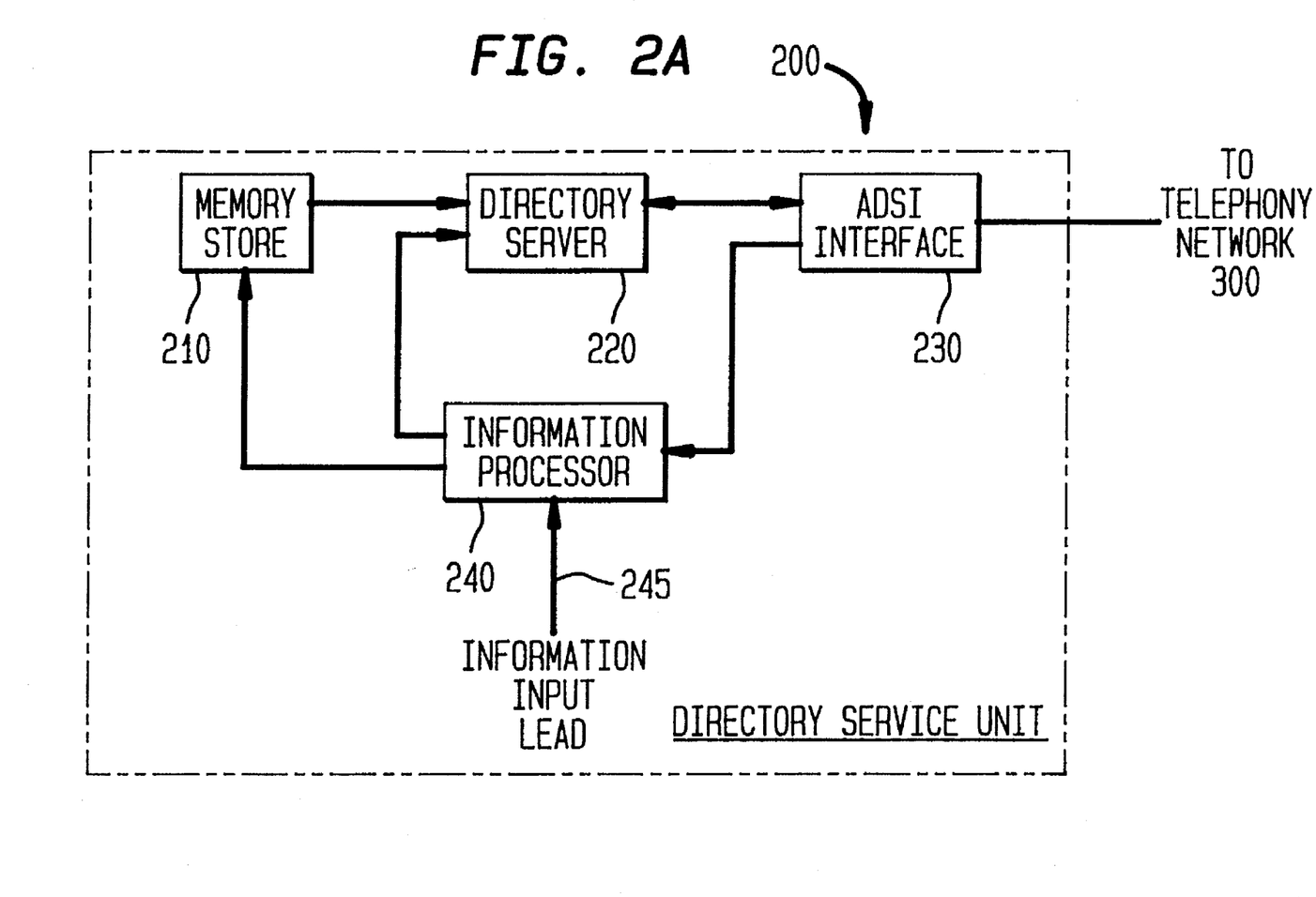
FIG. 2A depicts, in accordance with our invention, an illustrative embodiment of our directory service unit.

A detailed description of the directory service unit 200 is depicted in FIG. 2A, which unit includes a memory store 210, a directory server 220, an information processor 240, and an ADSI interface 230. Directory information is stored in memory store 210. Such directory information includes listings of TV programs to be shown on broadcast and cable TV networks arranged by network, TV channel, time of presentation, and category of program (e.g., sports, news, movies, daytime series), listings of a calendar of events by locality, listings of movies playing at cinemas, and similar information. The memory store 210 also includes menus of directory information to be presented to users to assist them in selecting desired directory information. In addition, the memory store 210 may contain program descriptions, in the form of text or audio, describing in greater detail any of the programs or events appearing in any of the directory listings. For example, the memory store 210 may contain detailed descriptions including the topic of discussion or the guests to appear on a talk show program, highlights of an upcoming episode of a day time soap opera, or the starting pitchers for a baseball game listed in the directory of programs.

Figure 2B:
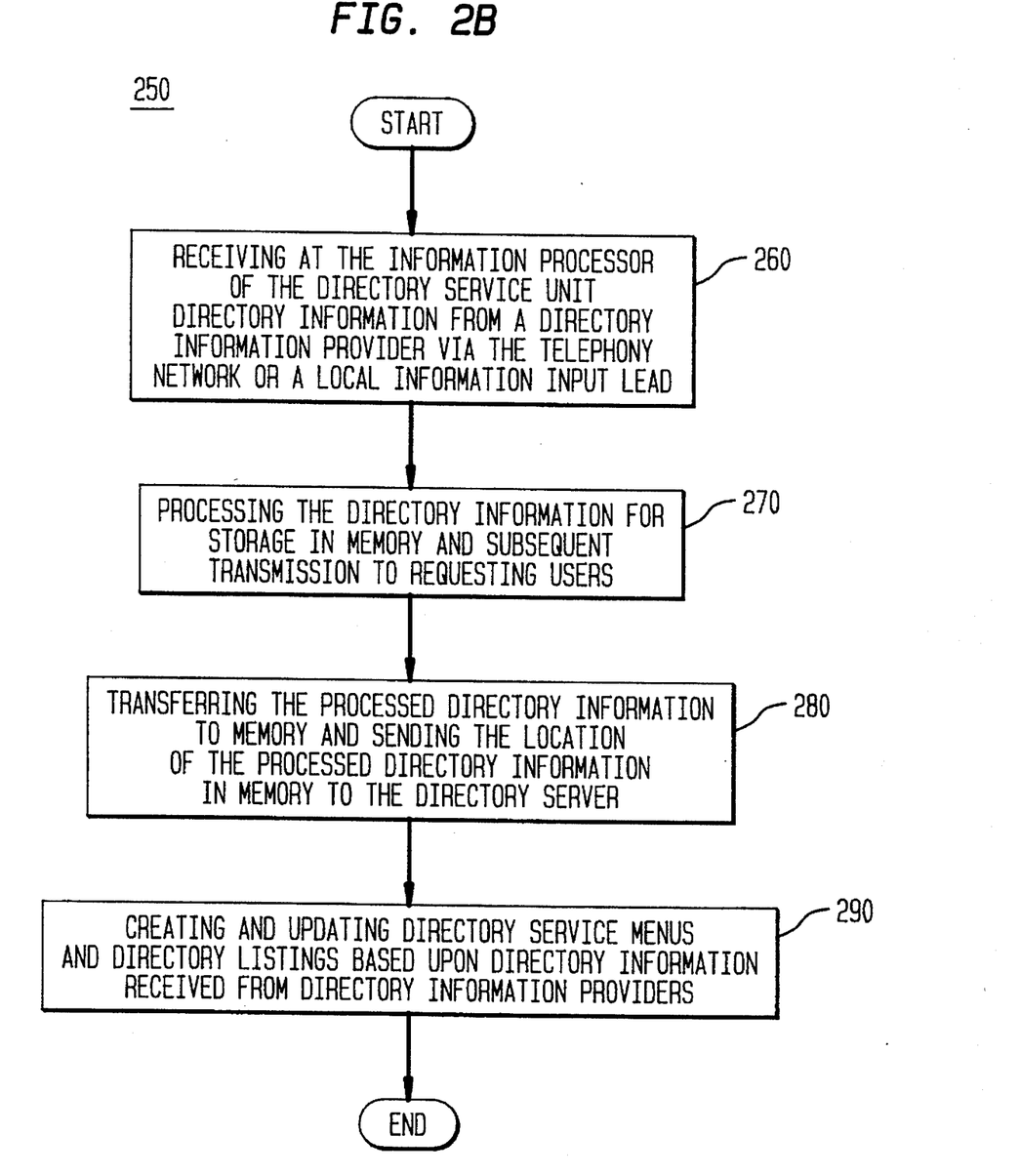
FIG. 2B shows, in accordance with our invention, a flow diagram of our method for storing directory information received from directory information providers at the directory service unit.

FIG. 2B depicts a flow diagram of our method 250 for storing directory information received from directory information providers at the directory service unit 200 using the information processor 240. The information processor 240 of the directory service unit 200 receives directory information and program descriptions to be processed for subsequent transmission to requesting users. The information and descriptions received by the information processor 240 are input locally at lead 245 or from the telephony network 300 via conventional data modems for data or local analog to digital conversion equipment for voice (Step 260 of FIG. 2B). The directory information and program descriptions are then processed at the information processor 240) into a form suitable for transmission to requesting users and stored in memory store 210 (Steps 270 and 280). The information processor 240 also creates, updates, and stores in the memory store 210 menus of directories available to the users as well as the directories of programs, based upon information received from directory information providers (Step 290).

Since program descriptions can be input over the telephony network 300, which is particularly suited for the transmission of voice signals, audio descriptions of programs spoken in the voice of individuals associated with the programs or event can be received at the information processor 240, stored in memory store 210, and played back to requesting users with the integrity of the speaker's voice intact. Specifically, audio detailed descriptions may be spoken in the voice of the program moderator, commentator, or star performer, or the mayor of the locality where an event is to be held to give the user a more personal invitation to watch the program or attend the event being described.

The ADSI interface 230 of the directory service unit 200 receives, in ADSI format (DTMF digits), requests for directory service and other inputs from user interface units 400. Additionally, the directory service unit 200 receives via the telephony network 300 directory information and program descriptions from directory information providers. Transmissions from directory information providers need not be in ADSI format, and therefore need not be converted at the ADSI interface, but are transferred directly to the information processor 240. DTMF digits transmitted by a user interface unit in ADSI format and received by the ADSI interface 230 are converted from the ADSI format into a form usable by the directory server 220. After conversion, the ADSI interface 230 sends users' requests and inputs to directory server 220. Data information sent by the directory server to users are converted to ADSI format at the ADSI interface and transmitted to the telephony network for further transmission to users. The ADSI interface precedes the transmission of the information signals with a CAS tone to alert the user interface unit of the coming data transmission, and the interface also waits for a specific DTMF to be returned to acknowledge the CAS tone.

Another components of the directory service unit 200 is the directory server 220 which responds to users' requests and inputs by interpreting the DTMF digits sent by the user, retrieving appropriate menus and directory information from the memory store 210 and transmitting the menus and directory information to users. The directory server receives from the information processor 240 and maintains location information indicating where directory information is stored (Step 280 of FIG. 2B). This location information is used by the directory server for retrieving directory information from the memory store 210.

Another component of our inventive system 100 is the telephony network 300 which interconnects the directory service unit 200, multiple user interface units 400 and voice/data transmission equipment 650 of multiple directory information providers. Equipment 650 could include a conventional telephony CPE and data communication equipment, such as a modem and computer. The telephony network 300 includes networks which support low speed voice and data communication between users. Illustratively, the telephony network could be the public switched telephony network (PSTN), which is a preferred low-cost alternative for transmitting voiceband signals over long distances. Alternatively, the telephony network 300 could also include a local area network.

Figure 3A:
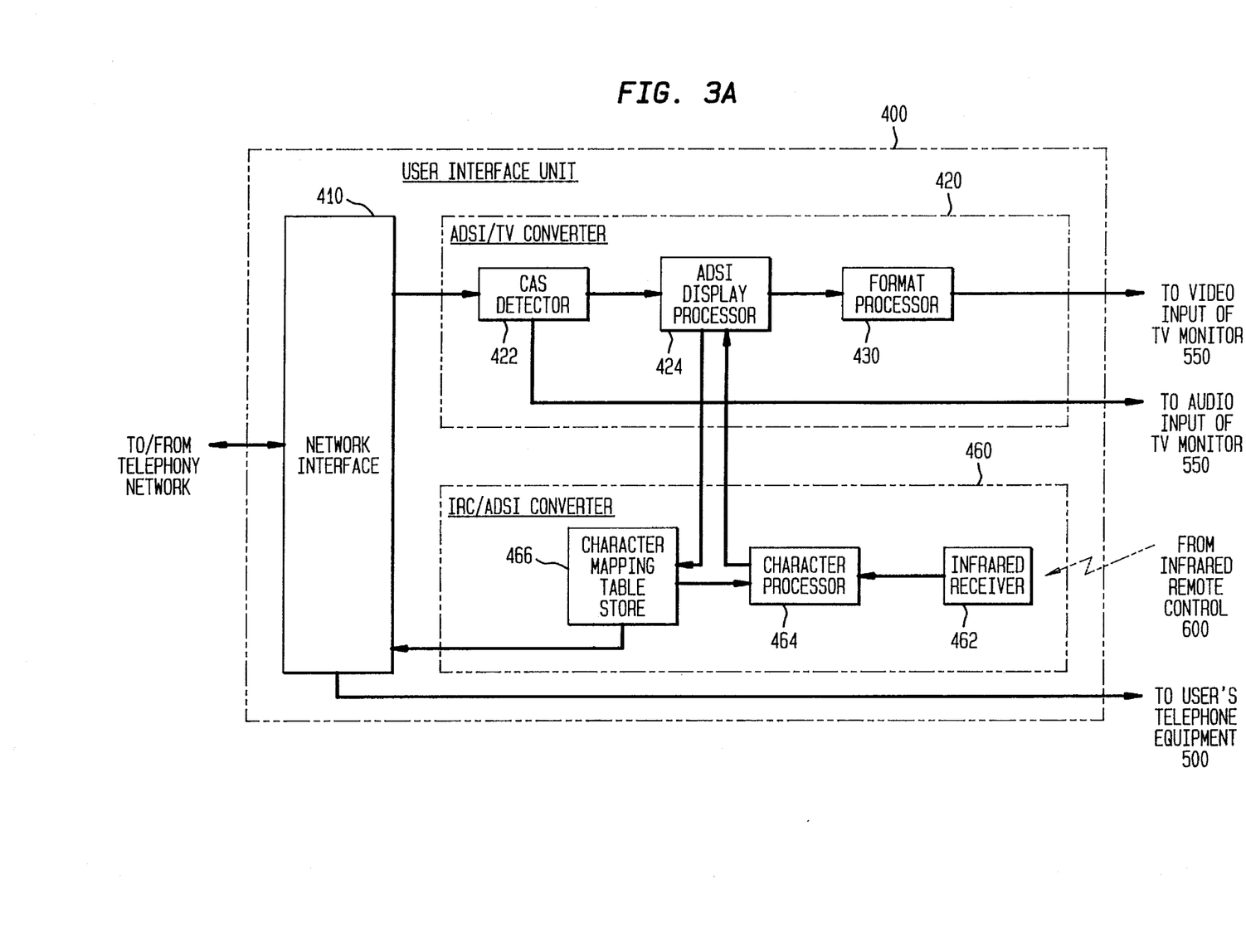
FIG. 3A depicts, in accordance with our invention, an illustrative embodiment of our user interface unit.

A representative embodiment of our user interface unit 400 is shown in FIG. 3A. The user interface units 400 includes a network interface 410, an ADSI/TV converter 420 and an infrared remote control (IRC)/ADSI converter 460. The network interface 410 receives from the directory service unit 200 via the telephony network 300 directory information in ADSI format to be presented to the user and passes this information to the ADSI/TV converter 420, where the information is converted into a form suitable for display at the user's TV monitor. In addition, the network interface 410 receives the user's requests and inputs, which are generated at the TV infrared remote control and detected and converted into ADSI format at the IRC/ADSI converter 460. The network interface 410 then transmits the user's requests and inputs to the directory service unit 200 for servicing.

Figure 3B:
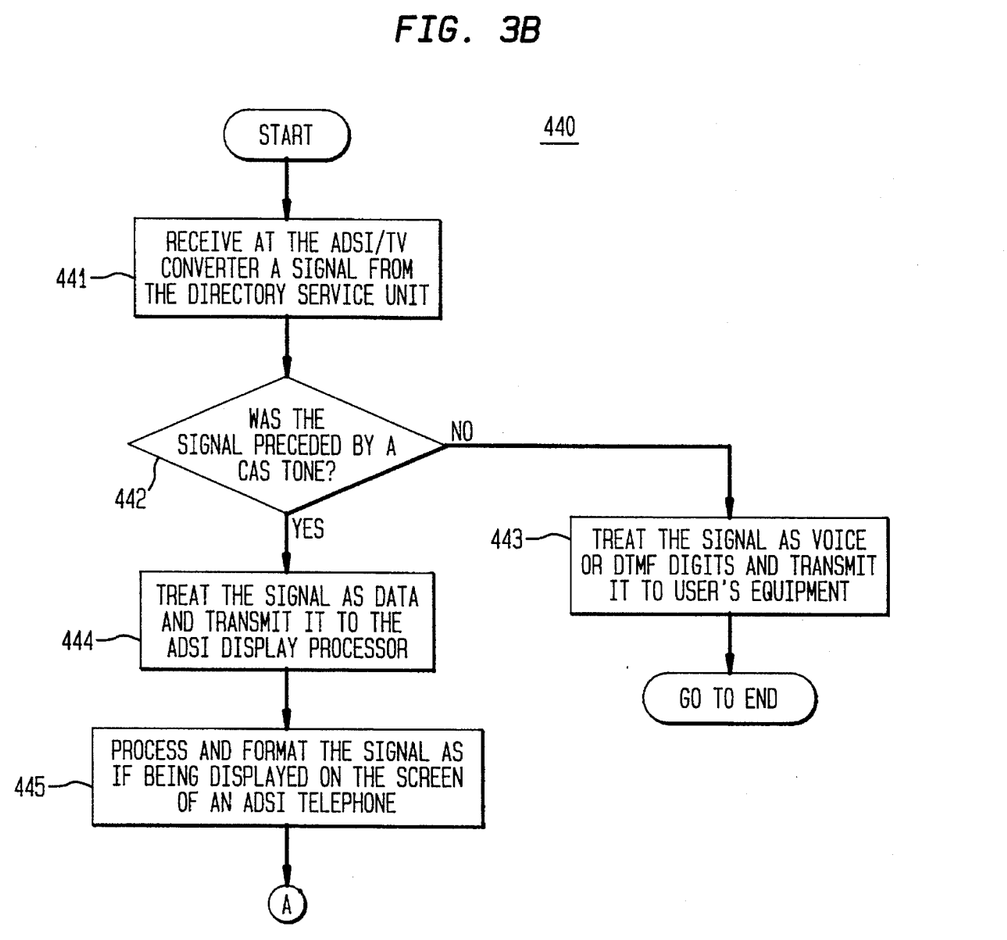
FIGS. 3B and 3C show, in accordance with our invention, a flow diagram of our method for converting from ADSI signals to TV format.
Figure 3C:
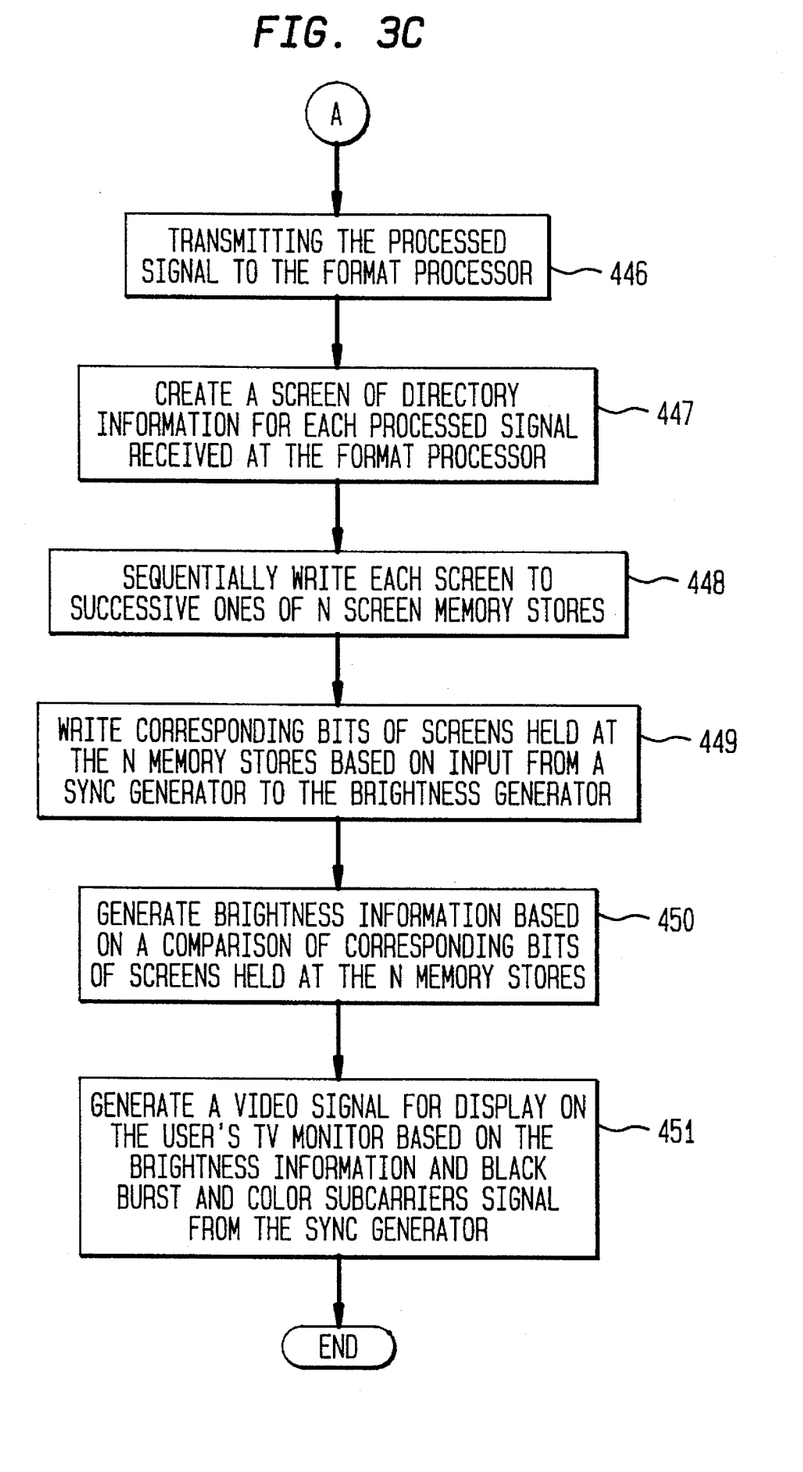

The ADSI/TV converter 42 converts data signals received at the user interface unit 400 from ADSI format to a signal format suitable for displaying the data on the screen of the user's TV monitor 550. For illustrative purposes, it is assumed that the signal format accepted by the user's TV monitor is the National Television Standard Committee (NTSC) format. If the signal received from the directory service unit 200 is not data, but voice, the ADSI/TV converter 420 transmits the signal to the audio input of the user's TV monitor. FIGS. 3B and 3C show a flow diagram of our method 440 for converting from ADSI signals to TV format.

The ADSI/TV converter 420 includes a CAS detector 422, an ADSI display processor 424, and a format processor 430. The CAS detector 422 is connected to the network interface 410 of the user interface unit 400, and this detector receives voice and data signals from the directory service unit 200 and controls further processing of signals from the directory service unit 200 based on the CAS tone detected or absence thereof preceding the receipt of the signals. If the CAS tone does not precede the incoming signal, the signal is treated as a voice signal (e.g., an audio program description) and transmitted to the audio input of user's TV monitor 550 or to the speaker of the user's telephone 500 (Steps 441–443 of FIG. 3B). If a CAS tone is detected at the CAS detector, the signal to follow is treated as data and transmitted to the ADSI display processor 424, where the data signal is processed and formatted as if the data signal were to be displayed on the screen of an ADSI telephone (Steps 441, 442, 444, and 445). Since the data signal is to be displayed on the user's TV monitor, the processed data signal from the ADSI display processor 424 is sent to the format processor 430, where the data signal is further processed into a signal suitable for display on the user's TV monitor (Step 446 of FIG. 3C).

Figure 3D:
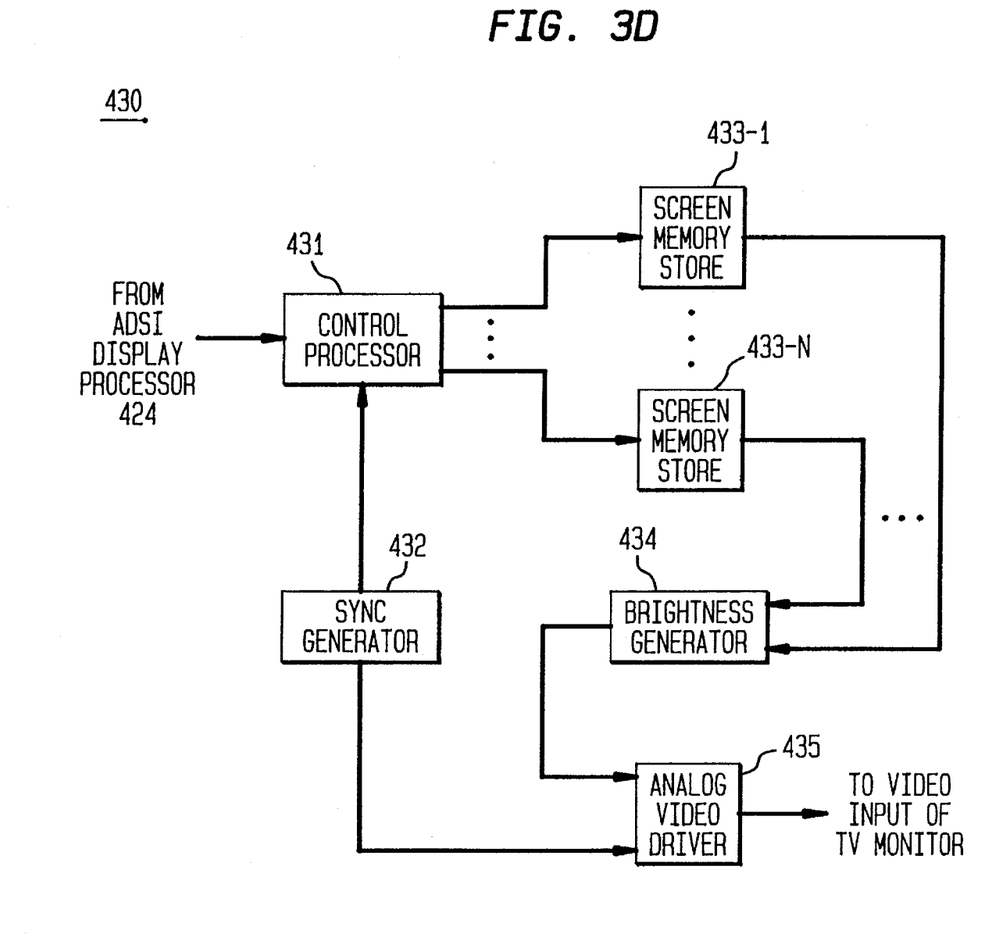
FIG. 3D depicts, in accordance with our invention, an illustrative embodiment of our format processor.

An illustrative embodiment of the format processor 430 is depicted in FIG. 3D, which format processor comprises a control processor 431, a sync generator 432, multiple screen memory stores 433-1 through 433-N, a brightness generator 434, and an analog video driver 435. The control processor 431 receives data signals from the ADSI display processor 424 and creates screens of directory information, wherein each screen is based upon data signals and comprises 240 horizontal lines and 320 vertical lines (Step 447). Each screen can be best described as a 240×320 matrix, wherein each block of the matrix contains a bit that is in an "ON" or "OFF" state. The control processor 431 transfers a first screen of directory information to the first of N screen memory stores 433-1. On receiving other data signals representing another screen of directory information from the ADSI display processor 424, the control processor 431 similarly creates a screen of directory information and stores the screen in the next of the N screen memory stores. Upon all memory stores being sequentially filled, the control processor 431 overwrites information in the first screen memory store (Step 448).

The control processor 431 also controls the writing of bits of information from each of the N screen memory stores to the brightness generator 434. The control processor 431 receives an input from the sync generator 432, which input is used by the control processor 431 to establish a read cycle for transferring bits of information held in screen memory stores 433-1 through 433-N to the brightness generator 434 (Step 449). The sync generator 432 establishes the rate at which screens of directory information are output to the user's TV monitor and provides this rate as input to the control processor 431. Under an NTSC video format, the rate is 60 screens per second.

At the brightness generator 434, the states of corresponding bits of information held at screen memory stores 433-1 through 433-N are compared, and the results of this comparison is used by the brightness generator to determine brightness information (Step 450). Illustratively, in an implementation of our format processor 430, four screens of directory information were held at four screen memory stores, and the following rules were applied in determining brightness information. If 3 or 4 of the corresponding bits of the four screens were in an "ON" state, then "HIGH" brightness information was generated. If 1 or 2 of the corresponding bits of the four screens were in an "ON" state, then "DIM" brightness information is generated. If none of the corresponding bits of the four screens were in an "ON" state, then "BLACK" brightness information is generated.

The brightness information is used at the analog video driver 435, along with black burst and color subcarrier signals from the sync generator 432, to produce a video signal in NTSC format to be displayed on the screen of the user's TV monitor (Step 451). The brightness of each bit of the video signal is determined by the brightness information of corresponding bits of the N screens of directory information. It should be noted that it was necessary to store N screens of directory information (i.e., more than one) because of the inherent differences between LCD and TV screen displays. Specifically, when the LCD screen display shows an unchanging view of a screen of directory information, the sequential screens of information may nevertheless be changing to highlight or change the intensity level of certain aspects of the directory information. The persistence of an LCD screen is different from the screen of an NTSC monitor, and changes in sequential screens may cause the NTSC screen to flicker, which may be annoying and visually intolerable to the user.

Figure 3E:
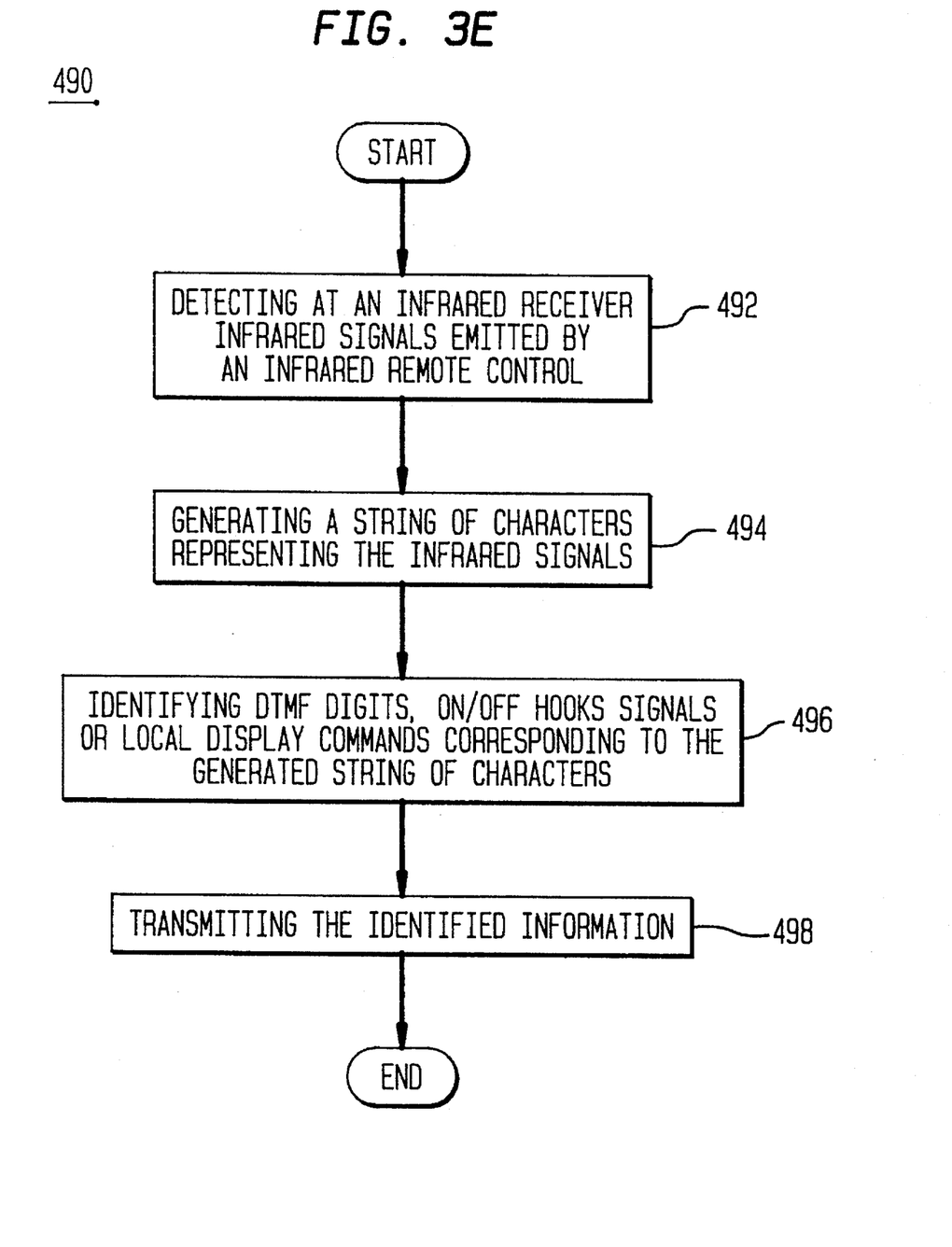
FIG. 3E shows, in accordance with our invention, a flow diagram of our method converting infrared signals from the infrared remote control of the user's TV monitor to ADSI signals.

The user interface unit 400 of FIG. 3A also includes an IRC/ADSI converter 460 that detects infrared signals generated at the infrared remote control 600 by the user and converts the infrared signals into local commands or DTMF digits compatible with the ADSI format for transmission to the directory service unit 200. The infrared remote control 600 is similar in appearance and function to the conventional remote controls used with TVs, VCRs, and set-top cable controllers. The IRC/ADSI converter 460 comprises an infrared receiver 462, a character processor 464, and a character mapping table store 466. A flow diagram describing the method 490 of operation of the IRC/ADSI converter 460 is depicted in FIG. 3E.

The infared receiver 462 detects infrared signals emitted by the infrared remote control 600 and generates a string of characters, which string is transmitted to the character processor 464 (Steps 492 and 494). The IRC/ADSI converter 460 also includes a memory store 466 which contains a mapping table which maps strings of infrared characters to OFF/ON hook signals, DTMF digits, or local display commands. Specifically, the "ON" button on the infrared remote control could map to an off hook signal for receiving dial tone and the "OFF" button could map to an on hook signal for terminating a call connection. Furthermore, the "UP" and "DOWN" buttons on the infrared remote control could map to local display commands for locally changing the appearance of information on the user's TV monitor.

On receiving a string of characters from the infared receiver 462, the character processor 464 identifies and retrieves from the mapping table and outputs the signals, digits, or commands corresponding to the string of characters (Steps 496 and 498). Some of the entries in the character mapping table may be transferred from the directory service unit 200 as signalling to the user interface unit 4, which entries are detected at the ADSI display processor 424 and transferred to the character mapping table store 466. DTMF digits and ON/OFF hook signals are transferred from the character processor 464 to the network interface 410. Local display commands are transferred from the character processor 464 to the ADSI display processor 424 of the ADSI/TV converter. Therefore, in essence the IRC/ADSI converter 460 allows the infrared remote control to be a wireless version of a telephone keypad, which generates DTMF digits, as well as a remote control, which generates commands for locally changing the appearance of the information on the screen of the TV monitor.

Figure 4:
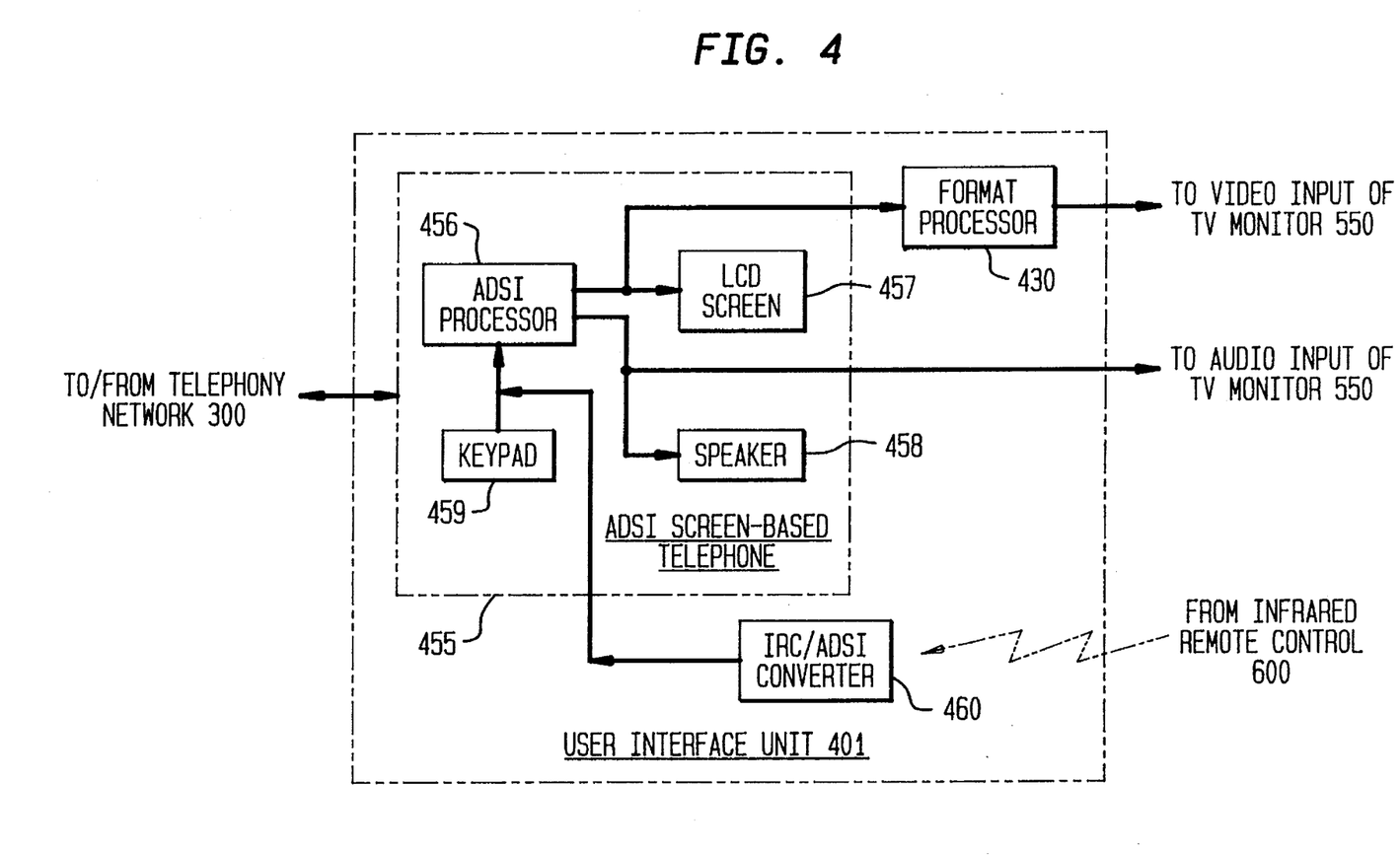
FIG. 4 depicts, in accordance with our invention, another illustrative embodiment of our user interface unit which employs an ADSI screen-based telephone.

FIG. 4 depicts another illustrative embodiment of our user interface unit 401 which utilizes an ADSI screen-based telephone 455, such as the Phillips Enhanced Telephone, Model P100, manufactured by Phillips Home Services International (see User Guide for Phillips Enhanced Telephone, 1992). The ADSI telephone essentially performs at its ADSI processor 456 the functions of the network interface 410, CAS detector 422, and ADSI display processor 424 described above. Furthermore, the ADSI telephone includes a keypad 459, which is connected to the ADSI processor, which keypad is used for entering DTMF digits or signalling local actions. Data signals are transmitted to the LCD screen 457 of the ADSI telephone 455, and voice signals are transmitted to an audio speaker 458. To present data and voice signals received at the ADSI telephone from the directory service unit 200, the format processor 430 is connected to the cable lead between the ADSI processor 456 and the LCD screen 457 of the ADSI telephone 455 such that the data signals output from the ADSI processor 456 are transmitted to the format processor 430 and processed as described above. In addition, the connection to the audio input of the user's TV monitor is connected to the cable lead between the ADSI processor 456 and the speaker 458 of the ADSI telephone 455 such that voice signals output from the ADSI processor 456 are transmitted to the audio input of the user's TV monitor 550. The voice signals may require amplification prior to being input at the user's TV monitor 550. Furthermore, the IRC/ADSI converter 460, described above, is connected to the cable lead between the ADSI processor 456 and the keypad 459 and enters the user's input at the infrared remote control.

Figure 5:
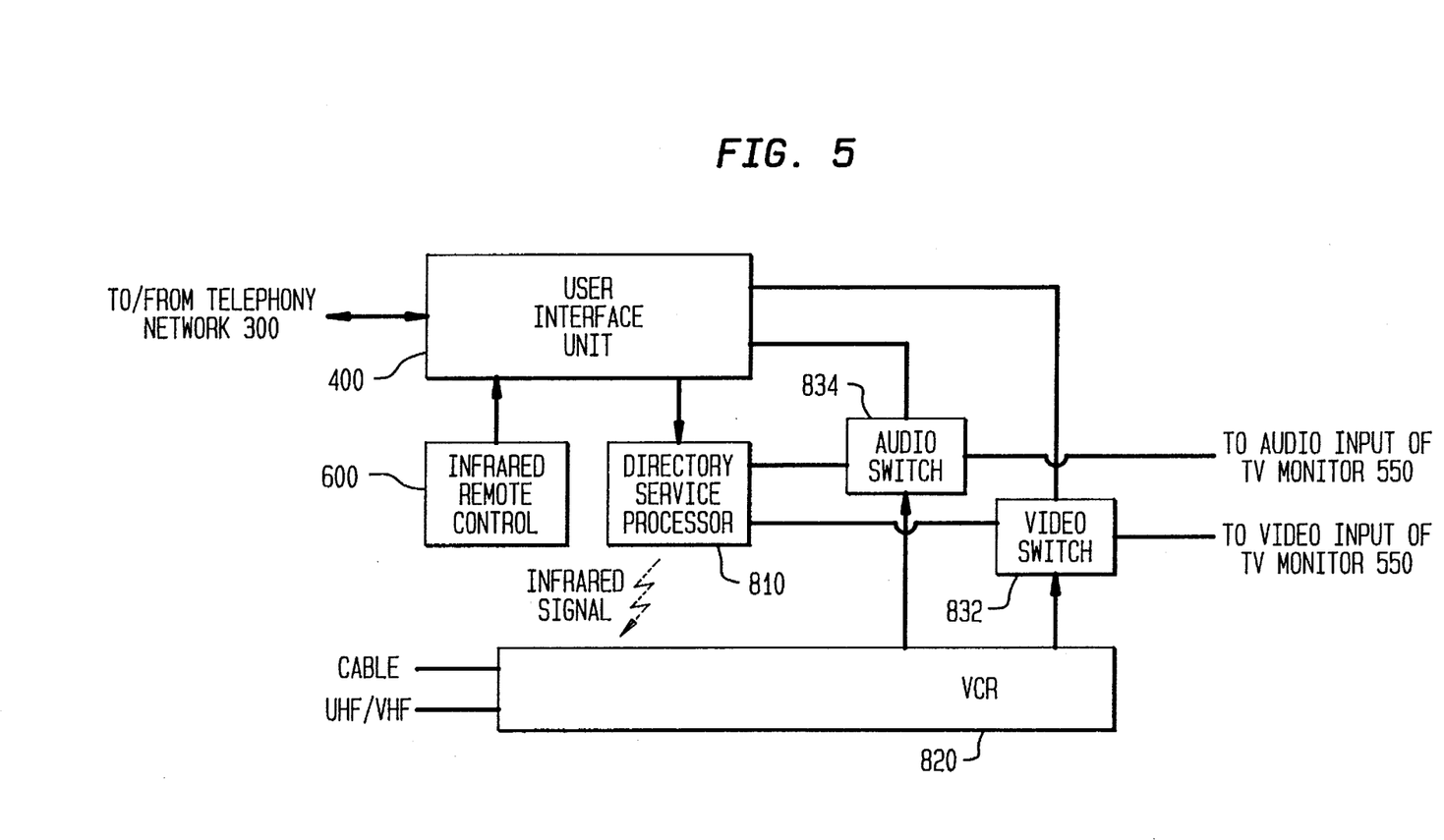
FIG. 5 depicts in accordance with our invention, an embodiment of our system, wherein the user interface unit 400 connects to a directory service processor, which controls the user's conventional video cassette recorder (VCR).

FIG. 5 depicts another embodiment of our system, wherein the user interface unit 400 connects to a directory service processor 810, which controls the user's conventional videocassette recorder (VCR) 820. Preferably, the directory service processor 810 includes an infared transmitter for remotely controlling the user's VCR 820 as shown in FIG. 5, but, alternatively, could be connected to the VCR via a cable lead. Although the directory service processor 810 is illustratively shown in FIG. 5 to be separate from the user interface unit 400, this processor could also be integrated into the user interface unit 400. The directory service processor 810 controls the recording of programs or transmission of programs from the user's VCR to the user's TV monitor based on programs selected by the user from directory listings appearing on the user's TV monitor.

Conventional VCRs are used for transmitting TV signals to a TV monitor when the "SWITCH" function is invoked by the user, or for recording programs appearing at a particular TV channel and having a particular start and end time, when the "RECORD" function is invoked by the user. Additionally, conventional VCRs contain remote control capabilities and include infrared receivers for receiving the "SWITCH", "RECORD", and other commands from an infrared remote control. In this embodiment of our invention, the user can invoke the "SWITCH" and "RECORD" functions at the VCR under the control of the directory service processor 810 by selecting programs in a directory listing appearing on the user's TV monitor.

The directory service unit 200 is connected to the ADSI display processor 424 of the user interface unit 400, which processor transfers to the directory service processor 810 information necessary to perform the "RECORD" function, "SWITCH" function, or both with respect to a program selected by the user. The user interface unit 400 is also connected to a video switch 832 and an audio switch 834, which are controlled by the directory service processor 810 to disconnect the user interface unit 400 from the TV monitor while a program is being presented to the user's TV monitor from the VCR 820. The user interface unit 400 is also connected to the user's TV monitor and infrared remote control as described above in FIGS. 3A and 4. In lieu of the TV infared remote control, the infrared remote control of the user's VCR, which contains "RECORD" and "SWITCH" keys, could be employed. In using the infrared remote control of the TV monitor, soft keys representing the "RECORD" and "SWITCH" functions would be input by the user to trigger the transfer of program information from the ADSI display processor 424 of the user interface unit 4 to the directory service processor 810.

Under this embodiment, the user can cause a program to be recorded at the VCR or transferred from the VCR's line inputs (i.e., cable or UHF/VHF inputs) to the user's TV monitor by selecting a program from the directory listing appearing on the user's monitor and selecting the soft key on the infared remote control corresponding to the "RECORD" or "SWITCH" commands, respectively. After generating a string of characters associated with the "RECORD" or "SWITCH" soft keys, the character processor 464 of the user interface unit 400 retrieves from the character mapping table store 466 and transfers to the ADSI display processor 424 a local input command with instructions to transfer the TV channel and start and end times of the selected program to the directory service processor 810, along with the associated "RECORD" or "SWITCH" command.

On receiving this information from the ADSI display processor 424, the directory service processor 810 causes the VCR 820 to record ("RECORD" function) or transfer to the user's TV monitor ("SWITCH" function) the program according to the channel and start and end times associated with the program. In addition, the directory service processor 810 controls the audio and video switches 832 and 834 based on the information received from the ADSI display processor 424. On receiving information associated with a selected program and a "SWITCH" command, the directory service processor 810 causes the switches 832 and 834 to disconnect the user interface unit 400 from the user' TV monitor to preclude directory information from interfering with the program being transferred from the VCR and displayed on the user's TV monitor.

Figure 6:
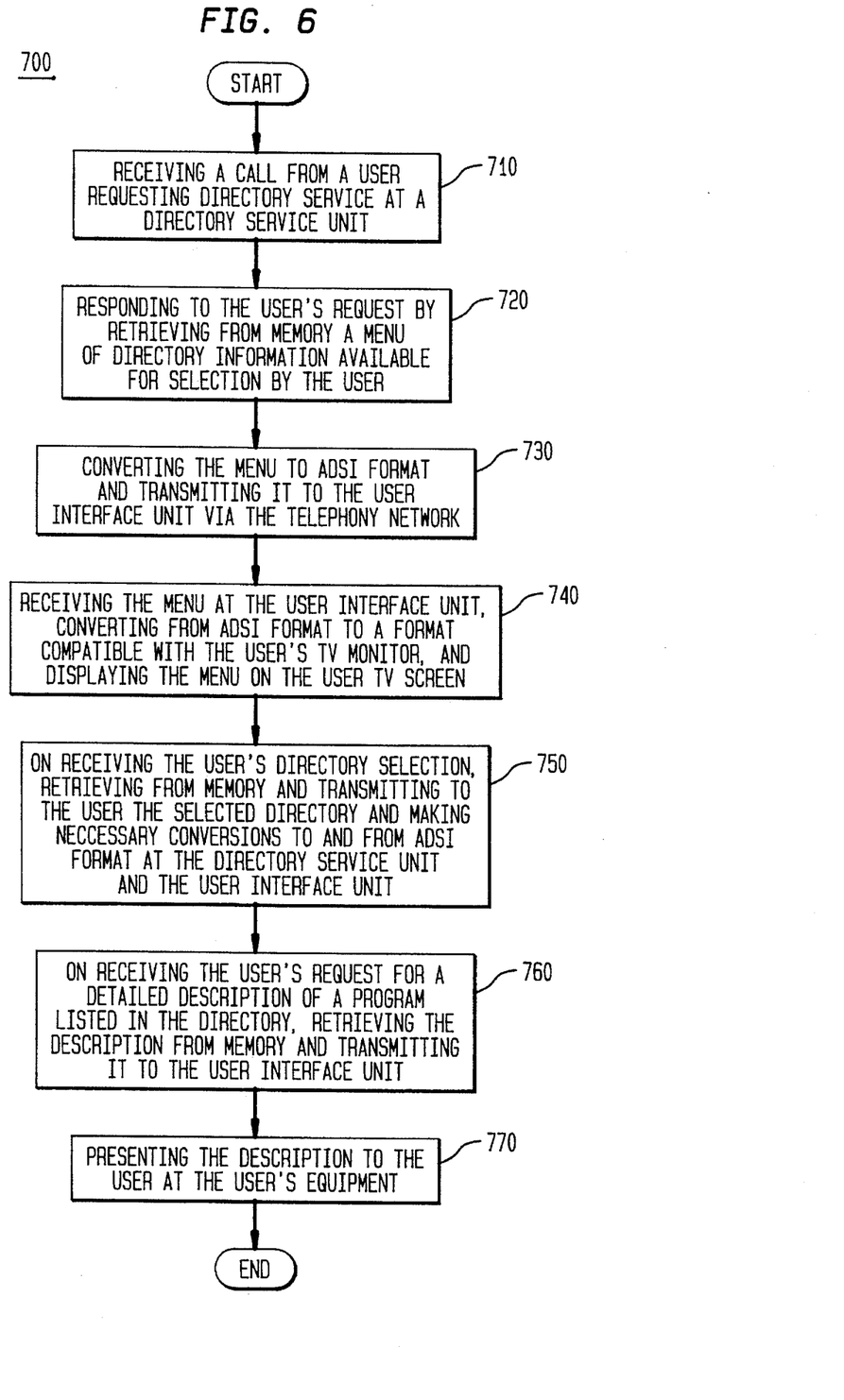
FIG. 6 shows, in accordance with our invention, a flow diagram of our inventive method for accessing directory information and presenting the directory information at the user's TV monitor.

Our inventive method for accessing directory information and presenting the directory information at the user's TV monitor is shown in the flow diagram 700 of FIG. 6. Once directory information is processed by the information processor 240 and stored in memory store 210, this information can be requested by users. A user generates a request for directory service by placing a call to the directory service unit 200, which call could be placed by interacting with the infrared remote control 600. Such interaction might include entering the DTMF digits associated with the telephone number of the directory service unit 200. The digits entered by the user are converted to ADSI format at the IRC/ADSI converter 460, as shown in FIG. 3E, and transmitted by the network interface 410 to the telephony network. Alternatively, the user could place a request for directory service by dialing the telephone number of the directory service unit directly from the keypad of the user's telephone equipment (or ADSI telephone as shown in FIG. 4). The dialed telephone number in the form of DTMF digits would be similarly transmitted by the network interface 410 to the telephony network 300.

On detecting a call from the user, the ADSI interface 230 of the directory service unit 200 answers, thus establishing a call connection between the directory service unit 200 and the user interface unit 400 via the telephony network 300 (Step 710 of FIG. 6. The ADSI interface 230 also detects the incoming call as a request for directory service and signals the directory server 220 of the user's request. The directory server 220 responds by retrieving from the memory store 210 a menu of directory information available for selection by the user (Step 720). The menu is converted into ADSI format at the ADSI interface 230 and transmitted over the telephony network 300 to the user interface unit 400 (Step 730). The menu is received at the network interface 410 of the user interface 400 and passed to the ADSI/TV converter 420, where the menu is processed for display on the user's TV screen as shown in FIGS. 3B and 3C (Step 740 of FIG. 6).

Using the "UP" and "DOWN" buttons on the infrared remote control 600, the user can scroll up and down, respectively, in the menu of available directory information. On locating a desired directory, the user selects the desired directory by inputting the designated soft key on the infrared remote control corresponding to the desired directory. On receiving the user's directory selection from the menu, the directory server transmits to the user the requested directory, which is received at the user interface unit 400 and displayed on the user's TV screen 550 (Step 750). Along with the requested directory, the user also receives instruction for accessing a detailed description of the programs listed in the directory, if available. On receiving a user's input for a program detailed description, the directory server responds by retrieving the detailed description from the memory store 210 and sending the description to the user interface unit (Step 760 of FIG. 6).

If the detailed description is an audio description transmitted as a voice signal, the audio description is transmitted to the audio input of the user's TV monitor or to the user's telephone speaker (Step 770). Alternatively, since the ADSI protocol handles the both voice and text, a textual program description could be transmitted as a data signal and converted to a video signal at the the ADSI/TV converter and displayed on the user's TV monitor.

CONCLUSION

A system and method for interactively accessing directory information over a telephony network employing the ADSI standard protocol and for presenting the directory information at the user's TV monitor have been described. The above-described embodiments of our invention are intended to be illustrative only. Numerous alternative embodiments of the present invention may be devised without departure from the spirit and scope of the following claims.

What is claimed is:

1. A system for providing directory information to users over a network and comprising:

a directory service unit, said directory service unit including a memory for storing directory information and information menus and interface means for receiving requests for directory information from users and for generating an alerting signal, and a plurality of user interface units connectable through the network to said directory service unit, each of said user interface unit being associated with a telephone and a TV monitor of a user and including means for detecting an alerting signal from said directory service unit, said alerting signal indicating to said each of said user interface units the type of information to be received thereafter, and for converting information thereafter received from said directory service unit into a form for video display at the user's TV monitor, means for receiving user inputs and converting said user inputs to a string of characters, memory means for storing a character mapping table which maps said string of characters to signalling information to be received by said directory service unit and a character processor for retrieving from said memory means said signalling information mapping to said string of characters and for transmitting said signalling information to said directory service unit through the network.

2. The system of claim 1, wherein each of said user interface units further includes interface means for transmitting audio signals, which include audible directory information, from said directory service unit to telephone equipment of said user and means, in the presence of said alerting signal, for transmitting signals from said directory service unit to a video input of said TV monitor of said user.

3. The system of claim 1 wherein said means, for detecting said alerting signal and for converting information thereafter received into a form for display includes a format processor comprising a control processor, a plurality of storage means defining memory screens for receiving information from said control processor, and brightness generator means connected to said storage means for controlling the display at said user's TV monitor.

4. The system of claim 1, wherein the network is a telephony network.

5. The system of claim 4, wherein said telephony network employs the Analog Display Service Interface (ADSI) protocol.

6. A method for providing video input signals for display at a user's TV monitor based on information signals received over a network, said method comprising the steps of:

storing screens of information based on said information signals received over the network, wherein a first set of information signals forms a first screen of information, a second set of information signals forms a second screen of information and an Nth set of information signals forms an Nth screen of information, wherein N is an integer, and wherein each of said screens of information is characterized by a matrix of blocks, each of said blocks having an associated bit in an "ON" or "OFF" state, comparing the states of bits of corresponding blocks of said first through said Nth screens, generating brightness information including a "HIGH" state or a "DIM" state, for each of said corresponding blocks of said screens by assigning a "HIGH" state to said corresponding blocks wherein results of said comparing step meets a set of predetermined comparison requirements and by assigning a "DIM" state to said corresponding blocks wherein results of said comparing step do not meet said set of predetermined comparison requirements, and controlling a video drive circuit based on said brightness information to produce the video input signals for display at the user's TV monitor.

7. The method of claim 6 further comprising the step of detecting an alerting signal prior to receiving said information signals over the network, said alerting signal indicating that the subsequent information signal is data representing video information.

8. The method of claim 7 further comprising the step of, in the absence of receipt of said alerting signal, transmitting information signals, which include audible directory information, received over the network to an audio input of the user's TV monitor.

9. A system for providing information over a telephony network in the ADSI protocol to a user's TV monitor, said system comprising:

a service unit including a memory for storing information, means for transmitting information signals over the telephony network to users, including audio and data signals, based on information stored in said memory, and interface means for receiving information from users and for transmitting an alerting signal to users, and a plurality of user interface units connectable through the telephony network to said service unit, said alerting signal indicating to said user interface unit the type of information to be received thereafter, each of said interface units being associated with a TV monitor of a user and including means for detecting said alerting signal from said service unit and means for converting said data signals received from said service unit and preceded by said alerting signal into video input signals for a user's TV monitor, said converting means including means for storing screens of information based on said information signals wherein a first set of information signals forms a first screen of information, a second set of information signals forms a second screen of information and an Nth set of information signals forms an Nth screen of information, wherein N is an integer, and wherein each of said screens of information is characterized by a matrix of blocks, each of said blocks having an associated bit in an "ON" or "OFF" state, means for comparing the states of bits of corresponding blocks of said first through said Nth screens, means for generating brightness information including a "HIGH" state or a "DIM" state, for each of said corresponding blocks of said screens by assigning a "HIGH" state to said corresponding blocks wherein results of said comparing step meets a set of predetermined comparison requirements and by assigning a "DIM" state to said corresponding blocks wherein results of said comparing step do not meet said set of predetermined comparison requirements, and means for controlling a video drive circuit based on said brightness information to produce the video input signals for display at the user's TV monitor.

10. The system of claim 9 further comprising means for detecting an alerting signal and, absent the detection of said alerted signal, for handling information signals subsequently received over the telephone network as including audible directory information.

11. An arrangement for converting data signals received from a directory service unit over a network into video signals for a user's TV monitor, comprising:

means for storing screens of information based on said information signals received over the network, wherein a first set of information signals forms a first screen of information, a second set of information signals forms a second screen of information and an Nth set of information signals forms an Nth screen of information, wherein N is an integer, and wherein each of said screens of information is characterized by a matrix of blocks, each of said blocks having an associated bit in an "ON" or "OFF" state, means for comparing the states of bits of corresponding blocks of said first through said Nth screens, means for generating brightness information including a "HIGH" state or a "DIM" state, for each of said corresponding blocks of said screens by assigning a "HIGH" state to said corresponding blocks wherein results of said comparing step meets a set of predetermined comparison requirements and by assigning a "DIM" state to said corresponding blocks wherein results of said comparing step do not meet said set of predetermined comparison requirements, and means for controlling a video drive circuit based on said brightness information to produce the video input signals for display at the user's TV monitor.

* * * * *